United States Patent
Ingels

(10) Patent No.: US 12,233,393 B2
(45) Date of Patent: Feb. 25, 2025

(54) LOW PRESSURE GENERATING PLASMA REACTOR CLOSED LOOP PROCESS AND SYSTEM

(71) Applicant: N2 Applied AS, Oslo (NO)

(72) Inventor: Rune Ingels, Svene (NO)

(73) Assignee: N2 APPLIED AS, Oslo (NO)

( * ) Notice: Subject to any disclaimer, the term of this patent is extended or adjusted under 35 U.S.C. 154(b) by 975 days.

(21) Appl. No.: 17/287,686

(22) PCT Filed: Oct. 23, 2019

(86) PCT No.: PCT/NO2019/050227
§ 371 (c)(1),
(2) Date: Apr. 22, 2021

(87) PCT Pub. No.: WO2020/085917
PCT Pub. Date: Apr. 30, 2020

(65) Prior Publication Data
US 2021/0402362 A1    Dec. 30, 2021

(30) Foreign Application Priority Data
Oct. 25, 2018 (NO) .................................. 20181378

(51) Int. Cl.
    *B01J 19/08*      (2006.01)
    *B01J 19/00*      (2006.01)
    (Continued)

(52) U.S. Cl.
CPC ......... *B01J 19/088* (2013.01); *B01J 19/0033* (2013.01); *B01J 19/2465* (2013.01);
(Continued)

(58) Field of Classification Search
CPC .. B01J 19/088; B01J 19/0033; B01J 19/2465; B01J 19/2475; B01J 2219/00051;
(Continued)

(56) References Cited

U.S. PATENT DOCUMENTS

| | | |
|---|---|---|
| 1,547,714 A | 7/1925 | Andriessens |
| 4,039,412 A | 8/1977 | Hill |
| | (Continued) | |

FOREIGN PATENT DOCUMENTS

| | | |
|---|---|---|
| CN | 1730115 | 2/2006 |
| CN | 103648975 | 3/2014 |
| | (Continued) | |

OTHER PUBLICATIONS

International Search Report (ISR) issued Jan. 14, 2020 in International (PCT) Application No. PCT/NO2019/050227.
(Continued)

*Primary Examiner* — Xiuyu Tai
(74) *Attorney, Agent, or Firm* — Wenderoth, Lind & Ponack, L.L.P.

(57) ABSTRACT

The present invention provides a low pressure generating plasma reactor closed loop process, comprising: feeding a fresh feed gas flow and a fresh feed absorption liquid flow to a plasma reactor closed loop comprising a condenser, a liquid loop, a recycle gas loop, and a plasma generator; converting feed gas to reactive plasma products in the plasma generator; quenching and absorbing the reactive plasma products into an absorption liquid circulating in the liquid loop where the reactive plasma products react to form liquid reaction products, thereby generating low pressure in the closed loop; monitoring the composition and low pressure of the recycle gas loop and, if the pressure increases, adjusting the composition of the fresh feed gas flow and/or fresh feed absorption liquid flow to bring the composition of the feed gas towards stoichiometric ratio with the absorbed reactive plasma products; extracting circulating absorption liquid, containing the liquid reaction products, from the plasma reactor closed loop as a product flow. The present invention also provides a low pressure generating plasma (Continued)

reactor closed loop system, comprising a plasma generator, a condenser, a recycle gas loop, a liquid loop, and a pump.

31 Claims, 10 Drawing Sheets

(51) Int. Cl.
*B01J 19/24* (2006.01)
*C01B 21/20* (2006.01)
*C01B 21/32* (2006.01)

(52) U.S. Cl.
CPC ......... *B01J 19/2475* (2013.01); *C01B 21/203* (2013.01); *C01B 21/32* (2013.01); *B01J 2219/00051* (2013.01); *B01J 2219/00162* (2013.01); *B01J 2219/00182* (2013.01); *B01J 2219/0884* (2013.01); *B01J 2219/0894* (2013.01)

(58) Field of Classification Search
CPC .... B01J 2219/00162; B01J 2219/00182; B01J 2219/0884; B01J 2219/0894; B01J 2219/0877; B01J 2219/0896; B01J 2219/0898; B01J 2219/0809; B01J 2219/0883; B01J 2219/0849; B01J 19/08; C01B 21/203; C01B 21/32; C01B 21/36; C01B 13/11; C01B 2201/14; C01B 15/027; H05H 1/48; H05H 1/2406; H05H 1/473; C02F 1/722; C02F 1/4618; C02F 1/4608; C02F 2303/04; C02F 2201/46155; C02F 2301/026; C02F 1/74; C02F 2201/4611; C02F 2201/46175; B01F 23/20; C05D 9/02; C05G 5/23; C05C 11/00

See application file for complete search history.

(56) References Cited

U.S. PATENT DOCUMENTS

| | | | |
|---|---|---|---|
| 4,287,040 A | 9/1981 | Alamaro | |
| 4,399,012 A * | 8/1983 | Chen | ........................ C01B 21/24 423/400 |
| 5,711,859 A | 1/1998 | Caramel et al. | |
| 9,440,889 B2 | 9/2016 | Ingels | |
| 2007/0163385 A1 | 7/2007 | Takahashi et al. | |
| 2013/0205657 A1* | 8/2013 | Keller | ...................... A01G 7/00 47/57.7 |
| 2015/0299056 A1 | 10/2015 | Ingels | |
| 2016/0102025 A1* | 4/2016 | Nunnally | ................. A01G 7/06 422/162 |
| 2017/0128906 A1 | 5/2017 | Louis et al. | |
| 2017/0163385 A1 | 6/2017 | Merlin et al. | |
| 2018/0071707 A1 | 3/2018 | Salerno | |
| 2018/0327283 A1 | 11/2018 | Pemen et al. | |

FOREIGN PATENT DOCUMENTS

| | | |
|---|---|---|
| CN | 105294175 | 2/2016 |
| CN | 107406280 | 11/2017 |
| EP | 1 630 133 | 3/2006 |
| EP | 2 788 037 | 10/2014 |
| FR | 2 549 459 | 1/1985 |
| GB | 644371 | 10/1950 |
| JP | 2010-132469 | 6/2010 |
| RU | 2 650 545 | 4/2018 |
| WO | 92/01922 | 2/1992 |
| WO | 2012/150865 | 11/2012 |
| WO | 2016/096751 | 6/2016 |

OTHER PUBLICATIONS

Norwegian Search Report issued May 22, 2019 in Norwegian Patent Application No. 20181378.
European Search and Examination Report issued Jun. 28, 2022 in European Patent Application No. 19875926.8.
Office Action issued May 23, 2022 in Chinese Patent Application No. 201980077399.4, with English-language translation.

* cited by examiner

LOW PRESSURE GENERATING PLASMA REACTOR CLOSED LOOP PROCESS AND SYSTEM

TECHNICAL FIELD OF THE INVENTION

The present invention relates to a low-pressure generating plasma reactor closed loop process and system. The closed synthesis loop is especially suited to produce low-pressure plasma from air and absorbing the NO containing plasma in water or a watery solution. The synthesis system can handle solid feed in the form of suspended material or fluidized powder.

BACKGROUND OF THE INVENTION

Plasma generation is in general to excite gas molecules with high-energy electrons from an electric arc, electrostatic or electro-dynamic field, Nano pulsed electric field, dielectric barrier discharge, laser-, radio- or micro-waves. Plasma can also be formed thermally or from chemical reactions or heat transfer.

The electrical field is accelerating the electrons and the achieved energy is depending on mean free path for the electron. The mean free path depends on the concentration of gas molecules. The key parameter is the combination of the field strength and the pressure of the gas where the electrons shall acquire its energy through velocity. One common parameter for describing the conditions is the reduced field strength given by the term Townsend, Td.

The definition of Townsend, Td, is the field strength, E, divided with the number of neutral molecules, atoms and plasma components, N. $Td = E/N$. To create plasma in air, a reduced electric field strength of 130 Townsend Td is required.

Air has its dielectric constant at 30 kV/cm at atmospheric conditions and at 0.1 bar the dielectric constant is 5-6 kV/cm according to Paschens law.

The below table is showing the required electrical field (kV/cm) for making a reduced electrical field of 130 Td at the combination of various pressures (bar) and temperatures (Kelvin).

|        | 0.2 bar | 0.4 bar | 0.6 bar | 0.8 bar | 1 bar | 1.2 bar |
|--------|---------|---------|---------|---------|-------|---------|
| 1000 K | 1.88    | 3.77    | 5.65    | 7.53    | 9.42  | 11.3    |
| 2000 K | 0.94    | 1.88    | 2.83    | 3.77    | 4.71  | 5.65    |
| 3000 K | 0.63    | 1.26    | 1.88    | 2.51    | 3.14  | 3.77    |
| 4000 K | 0.47    | 0.94    | 1.41    | 1.88    | 2.35  | 2.83    |
| 5000 K | 0.38    | 0.75    | 1.13    | 1.51    | 1.88  | 2.26    |
| 6000 K | 0.31    | 0.62    | 0.94    | 1.26    | 1.57  | 1.88    |

The energy required to create an absolute pressure of 0.2 bar is significant, and this energy requirement has inhibited the industrialization of technologies using low pressure. A typical plasma process has both a feed and a product consisting of gases and further, only a small fraction of the gas is converted to a product. The classical synthesis of NO from air $N_2 + O_2 = 2NO$ is giving typically 2% NO in the air.

When the yield of the product in a plasma process is as low as 2% the relative vacuum compression energy becomes significant. In the development of the present invention it was found that at a yield of 2% NO the energy required for creating the vacuum of 0.2 bar is 20 GJ/tN reacted to NO.

The cost of doing an air separation to overcome the stoichiometric imbalance is also costly and making an otherwise elegant process more complicated. Industrial air separation for an ammonia process is costing 6-10 GJ/tN.

In classical nitric acid production ammonia, $NH_3$, is combusted catalytically in air going through a net of platinum alloy to make NO gas. The absorption of NO into water to form nitric acid is a two-step reaction according to equation I, II & III. The combination of gas phase and liquid phase reactions are slowing down the process. High temperature is required for the gas phase oxidation reaction, and low temperature is required to absorb the reactants into the watery phase. The result is huge absorption towers at elevated pressure for the reactions I, II & III below to run complete.

$$2NO + O_2 = 2NO_2 \qquad \qquad I$$

$$3NO_2 + H_2O = 2HNO_3 + NO \qquad \qquad II$$

$$4NO + 3O_2 + 2H_2O = 4HNO_3 \qquad \qquad III = 3*I + 2*II$$

Nitric Acid is a typical intermediate key product in industrial fertilizer production. The high volume commercial product is ammonium nitrate, $NH_4NO_3$.

The disadvantage of combining a low yield plasma process for making 2% NO at atmospheric pressure is the energy cost of heating the air to facilitate the breakdown of the air at between 3500-6000 Kelvin, the energy cost is theoretically more than 400 GJ/tN.

The disadvantage of operating a low yield plasma process at a pressure of less than 0.2 bar, is the cost of creating the vacuum, being minimum 20 GJ/tN.

The disadvantage of operating a low yield once through process making 2% NO is the cost of cleaning and treating the unreacted gas flow.

The object of the invention is to provide low pressure in a plasma reactor closed loop process and system.

SUMMARY OF THE INVENTION

The present invention provides a low pressure generating plasma reactor closed loop process, comprising:
  feeding a fresh feed gas flow and a fresh feed absorption liquid flow to a plasma reactor closed loop comprising a condenser, a liquid loop, a recycle gas loop, and a plasma generator;
  converting feed gas to reactive plasma products in the plasma generator;
  quenching and absorbing the reactive plasma products into an absorption liquid circulating in the liquid loop where the reactive plasma products react to form liquid reaction products, thereby generating low pressure in the closed loop;
  monitoring the composition and low pressure of the recycle gas loop and, if the pressure increases, adjusting the composition of the fresh feed gas flow and/or fresh feed absorption liquid flow to bring the composition of the feed gas towards stoichiometric ratio with the absorbed reactive plasma products;
  extracting circulating absorption liquid, containing the liquid reaction products, from the plasma reactor closed loop as a product flow.

In an embodiment of the above process, the composition and pressure is monitored by a controller, preferably a programmable logic controller (PLC) comprising a feedback control.

In a further embodiment of the above process, the flow of the fresh feed gas and/or the flow of the fresh feed absorption liquid is adjusted if the pressure increases.

In a further embodiment of the above process, the generated low pressure is less than 1.2 bar, preferably less than 1.0 bar, more preferably less than 0.8 bar, more preferably less than 0.6 bar, more preferably less than 0.4 bar, more preferably less than 0.2 bar, more preferably less than 0.1 bar.

In a further embodiment of the above process, the pressure in the recycle gas loop is reduced towards the vapor pressure of the absorption liquid.

In a further embodiment of the above process, the absorption liquid is circulated in the liquid loop by a pump.

In a further embodiment of the above process, the recycle gas flow is recycled from the condenser to one or more of the plasma generator, an ejector, or other part of the plasma reactor closed loop.

In a further embodiment of the above process, the pressure in the plasma generator and reactive plasma products is further reduced by the ejector, where the circulating absorption liquid is used as motive fluid in the ejector.

In a further embodiment of the above process, mass balance in the plasma reactor closed loop is controlled by the feed of fresh absorption liquid.

In a further embodiment of the above process, the stoichiometric ratio of the composition of the feed gas to the absorbed reactive plasma products is balanced, e.g. by adjusting temperature and/or pressure, to avoid accumulation of unreacted gas which would create a pressure build-up.

In a further embodiment of the above process, at least part of the absorption liquid from the condenser is oxidized in an oxidizing tower.

In a further embodiment of the above process, the plasma is NO-containing plasma.

In a further embodiment of the above process, the fresh feed gas flow is selected from air, oxygen-enriched air, nitrogen, carbon dioxide, and any mix thereof.

In a further embodiment of the above process, the quenching is performed with gas, liquid, solid, or any combination thereof.

In a further embodiment of the above process, the quenching is performed with air, oxygen-enriched air, nitrogen, steam, water, carbon dioxide, carbonate mineral, recycle gas from the condenser, or a mix of any of these.

In a further embodiment of the above process, the absorption liquid is water.

In a further embodiment of the above process, a combination of plasma and quenching is selected as follows: air plasma quenched with water or steam; nitrogen plasma quenched with water or steam; air plasma quenched with carbon dioxide; air plasma quenched with a carbonate mineral; or air plasma enriched with oxygen quenched with water.

The present invention also provides a low pressure generating plasma reactor closed loop system, comprising (a) a plasma generator, wherein a fresh feed gas flow is converted to reactive plasma products; (b) a condenser, wherein the reactive plasma products are absorbed into an absorption liquid, thereby generating low pressure in the closed loop; (c) a recycle gas loop recycling gas from the condenser to the plasma generator or an ejector; (d) a liquid loop recycling the absorption liquid; and (e) a pump for circulating the absorption liquid from the condenser in the liquid loop.

In an embodiment, the system according to the invention further comprises a controller, preferably a programmable logic controller (PLC) comprising a feedback control, monitoring the low pressure and composition of the recycle gas loop.

In a further embodiment, the system according to the invention further comprises a fresh feed gas flow inlet, a fresh absorption liquid inlet, and a product flow outlet.

In a further embodiment, the system further comprises an oxidizing tower wherein at least part of the circulating absorption liquid from the condenser is oxidized.

In a further embodiment, the system further comprises a fresh liquid feed flow inlet and/or solid feed flow inlet for feeding liquid and/or solid reactants into the plasma reactor closed loop.

In a further embodiment, the system further comprises an oxygen-conducting membrane.

DETAILED DESCRIPTION OF THE INVENTION

Figure 1:
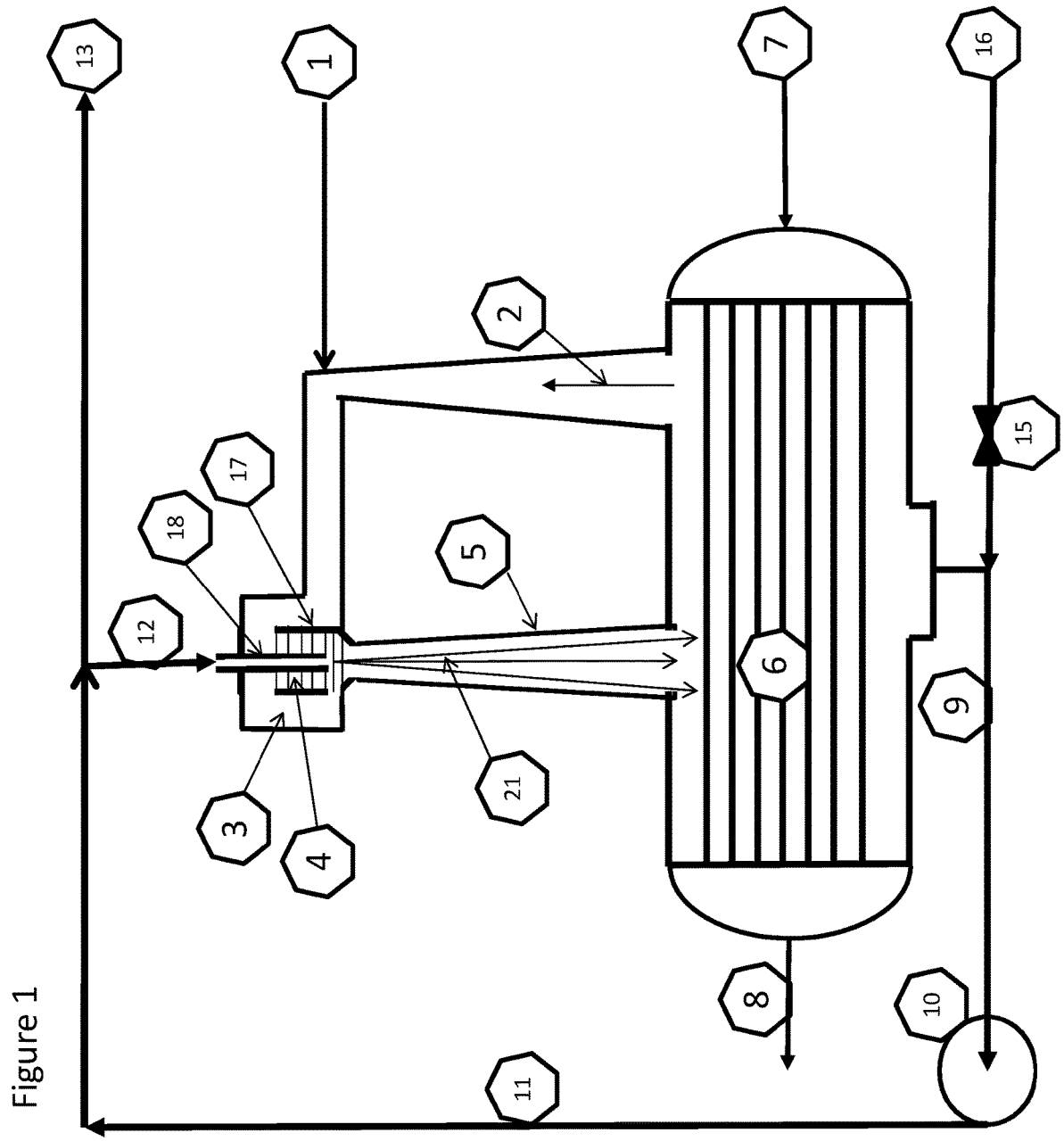
FIGS. 1, 1a-c are showing the low pressure plasma synthesis loop. The loop is closed and the pressure is kept close to the vapor pressure of the water at the temperature achieved by the cooling water.

The present invention relates to a low pressure plasma reactor closed loop process and system. The low pressure plasma reactor closed loop comprises a liquid loop and a recycle gas loop. The liquid loop and recycle gas loop are closed loops. In a closed plasma reactor loop or closed plasma synthesis loop, low pressure is created by means of absorbing or precipitating the reaction products, thereby reducing the pressure fraction of inerts and gases as well as the total pressure in the reaction loop towards the vapor pressure of the absorbent and or the precipitates. The closed synthesis loop is especially suited to produce low-pressure plasma from air, and absorbing the NO containing plasma in water or a watery solution. The synthesis system can handle solid feed in the form of suspended material or fluidized powder.

The low pressure generating plasma reactor closed loop process of the invention comprises feeding a fresh feed gas flow and a fresh feed absorption liquid flow to a plasma reactor closed loop comprising a condenser, a liquid loop, a recycle gas loop, and a plasma generator. Feed gas is converted to reactive plasma products in the plasma generator. The reactive plasma products are quenched and absorbed into an absorption liquid circulating in the liquid loop where the reactive plasma products react to form liquid reaction products, thereby generating low pressure in the closed loop. The composition and low pressure of the recycle gas loop are monitored. If the pressure increases, the composition of the fresh feed gas flow and/or fresh feed absorption liquid flow is adjusted to bring the composition of the feed gas towards stoichiometric ratio with the absorbed reactive plasma products. Circulating absorption liquid, containing the liquid reaction products, is extracted from the plasma reactor closed loop as a product flow.

At least part of the circulating absorption liquid is removed from the plasma reactor closed loop as a product flow.

The composition and pressure may be monitored by a controller, preferably a programmable logic controller (PLC) comprising a feedback control.

The flow of the fresh feed gas and/or the flow of the fresh feed absorption liquid may be adjusted if the pressure increases.

The generated low pressure in the closed loop may be less than 1.2 bar. Preferably the generated low pressure is less than 1.0 bar. More preferably the generated low pressure is less than 0.8 bar. More preferably the generated low pressure is less than 0.6 bar. More preferably the generated low pressure is less than 0.4 bar. More preferably the generated low pressure is less than 0.2 bar. More preferably the generated low pressure is less than 0.1 bar.

The pressure in the recycle gas loop may be reduced towards the vapor pressure of the absorption liquid.

The gas flow passed through the plasma generator may be fresh feed gas flow, recycle gas flow, or a combination thereof. The quenching may be performed with a quenching flow. The quenched plasma-containing gas flow may be cooled and absorbed into the absorption liquid. Gas reactants react to form liquid reaction products. Thereby the pressure in the closed loop is reduced. The pressure is reduced due to the absorption of the plasma-containing flow into the absorption liquid. The conversion of gases to liquid or solid phase is reducing the total volume and reducing the pressure in the closed loop. At least part of the absorption liquid containing the reaction products is removed from the closed loop as a product flow. The closed loop may further comprise an ejector.

The absorption liquid can be circulated in the liquid loop by a pump.

The recycle gas flow can be recycled from the condenser to the plasma generator. In another embodiment, the recycle gas flow can be recycled from the condenser to an ejector. In a further embodiment, the recycle gas flow can be recycled from the condenser to one or more of the plasma generator, an ejector, or other part of the plasma reactor closed loop. The recycle gas flow can be recycled from the condenser to both the plasma generator and ejector. In a further embodiment, the recycle gas flow can contain liquid.

The recycle gas loop can comprise at least part of the fresh feed gas flow. The recycle gas loop can comprise at least part of the recycle gas flow from the condenser to the plasma generator. The recycle gas loop can comprise at least part of the fresh feed gas flow and at least part of the recycle gas flow from the condenser to the plasma generator.

The pressure in the plasma generator and plasma-containing flow can be further reduced by the ejector. The circulating absorption liquid can be used as motive fluid in the ejector. In an embodiment of the process, the pressure in the plasma or gas phase is further reduced by using cooled absorption liquid as motive force in a circulation ejector, where plasma is sucked into the low pressure ejector and the outlet is indirectly cooled and condensed.

In an embodiment of the process, oxygen enriched air is used as the feed gas for making NO containing plasma and water is used as the absorption liquid. The water is preferably cooled water. The water can contain alkaline components reacting with the acidic absorption products from the NO containing plasma. In an embodiment, the water contains acidic components reacting with the alkaline absorption products from the plasma. In the process, the pressure and/or temperature can be adjusted to give a stoichiometric balance between acidic and alkaline components. The plasma can be generated in the plasma generator by an electro-static or electrodynamic field. In the process, quenching water can be in the form of a water spray, water vapor, steam, or a combination thereof.

A fresh liquid feed flow, fresh solid feed flow, or both, can also be fed to the closed loop. The fresh feed can be fed in a stoichiometric feed-to-product ratio. The mass balance in the process or system can be controlled by the feed of fresh absorption liquid. The stoichiometric ratio of the composition of the feed gas to the absorbed reactive plasma products can be balanced e.g. by adjusting temperature and/or pressure, to avoid accumulation of unreacted gas which would create a pressure build-up.

At least part of the absorption liquid from the condenser can be oxidized in an oxidizing tower.

The plasma generated in the plasma generator can be NO-containing plasma.

The fresh feed to the closed loop can be gas in combination with liquid and/or solid. The quenching can be performed with gas, liquid, solid, or any combination thereof.

Examples of the fresh feed gas flow are air, oxygen-enriched air, nitrogen, carbon dioxide, and any mix thereof. Further, examples of the quenching flow are air, oxygen-enriched air, nitrogen, steam, water, carbon dioxide, carbonate mineral, recycle gas from the condenser, and a mix of any of these.

The absorption liquid can be water. In another embodiment, the absorption liquid can be a watery solution.

The combination of fresh feed plasma and quenching can be air plasma quenched with water or steam; nitrogen plasma quenched with water or steam; air plasma quenched with carbon dioxide; air plasma quenched with a carbonate mineral; or air plasma enriched with oxygen quenched with water.

The present invention also relates to a low pressure generating plasma reactor closed loop system. The system comprises a plasma generator, wherein a fresh feed gas flow is converted to reactive plasma products. The system also comprises a condenser, wherein the reactive plasma products are absorbed into an absorption liquid, thereby generating low pressure in the closed loop. Further, the system comprises a recycle gas loop recycling gas from the condenser to the plasma generator or an ejector. The system also comprises a liquid loop recycling the absorption liquid. Further, the system comprises a pump for circulating the absorption liquid from the condenser in the liquid loop.

The system may further comprise a controller, preferably a programmable logic controller (PLC) comprising a feedback control, monitoring the low pressure and composition of the recycle gas loop.

In an embodiment, the system comprises an ejector. The plasma-containing flow can be quenched with a quenching flow upstream or at the inlet of the ejector. In the condenser, quenched plasma-containing flow, e.g. from the ejector, may be cooled and absorbed into an absorption liquid. The recycle gas loop feeds a recycle flow from the condenser to one or more of the plasma generator, ejector, or other part of the closed loop. The pump circulates the absorption liquid in the plasma reactor closed loop. In an embodiment, the pump circulates the absorption liquid from the condenser to the ejector, wherein the absorption liquid is used as motive fluid in the ejector. The ejector may be replaced by a pump(s) and or fan(s).

In an embodiment, the system comprises a fresh feed gas flow inlet, a fresh absorption liquid inlet, and a product flow outlet.

The system can comprise an oxidizing tower. In the oxidizing tower, at least part of the circulating absorption liquid from the condenser can be oxidized. The system may comprise a fresh liquid feed flow inlet and/or solid feed flow inlet. The fresh liquid and solid feed inlets can feed liquid and solid reactants into the plasma reactor closed loop. The system may comprise an oxygen-conducting membrane.

The plasma generator can be an electric arc, an electrostatic field, an electrodynamic field, a nano pulsed electric field, a dielectric barrier discharged, a laser-, radio- or micro-wave driven plasma generator, or any combination thereof.

The closed synthesis loop is especially suited to produce low-pressure plasma from air, and absorbing the NO containing plasma in water or a watery solution. The process and system can handle solid feed in the form of suspended material or fluidized powder.

Generally, it is most favorable to operate processes at high pressure when gases are to be absorbed into liquids. However, when using plasma, it is most favorable to operate processes at low pressure to absorb said gases into liquids, and in a loop with recycling of unreacted components. The energy efficiency is improved. The pressure in the recycled gas loop may be maintained low by controlling the composition of the feed. Reduction of the pressure is obtained because the gas reaction and absorption reaction takes place in the same loop. Thus, the pressure is reduced with no energy cost. Gas components are preferably fed to the loop in a stoichiometric ratio to the liquid products.

In an embodiment, the present invention is a closed loop low-pressure plasma synthesis, where lowering the pressure in the plasma generation and plasma reaction zone is achieved by absorbing the final product into water or a watery solution. The stoichiometry of the feed and products in and out of the plasma synthesis is in balance, to avoid accumulation of the surplus of inerts or unreacted components. The stoichiometry of pure air is in balance with water and carbon dioxide to provide oxygen for the surplus nitrogen in the untreated air. The product can range from pure nitric acid to an alkaline ammonium nitrate solution. The overall stoichiometry for making neutral ammonium nitrate from air and water is:

$$8N_2 + 4O_2 + 16H_2O = 8NH_4NO_{3(aq)} \qquad \text{XI}$$

The overall stoichiometry seen in equation XI has enriched the air by doubling the moles of oxygen.

Figure 2:
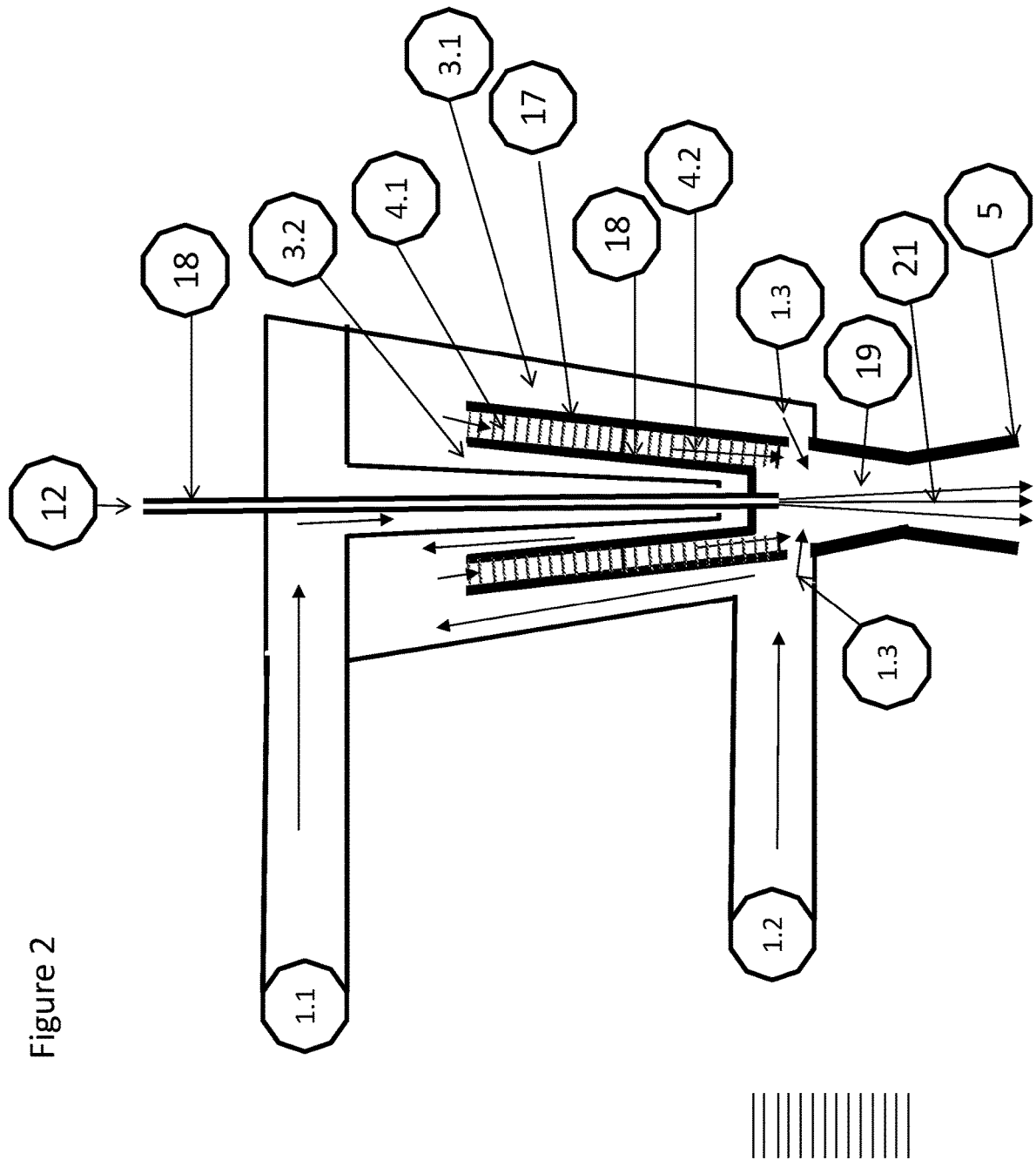
FIG. 2 is showing the plasma nozzle and ejector. The ejector is circulating the liquid in the loop and also using the liquid as motive fluid for liquid gas ejector. The liquid gas ejector is circulating the gas phase in the loop.

The synthesis comprises a plasma generator, FIG. 2, zones 4.1 and 4.2, where in an embodiment air or nitrogen converts into plasma products of nitrogen and oxygen. In the process, the plasma is cooled in contact with electrodes 17 and 18 and reactor walls in FIG. 2.

The air or nitrogen plasma is quenched directly with air, steam or carbon dioxide or a mix of these components depending on the product requirement. The quenching will freeze the plasma to its primary gas products with a retention time of $10^{-3}$ to $10^{-6}$ seconds. The driving force in circulating and mixing the gas and liquid phase can be an ejector system where the motive fluid 12 is injected into the plasma and gas chamber 19.

After the quenching, the primary plasma products will be absorbed into the watery phase at highly turbulent conditions giving high transport and energy transfer conditions. In this process stage, NO will be cooled and absorbed in the watery solution 9 as $N_2O_4$, $N_2O_3$ and $HNO_2$. In the reaction schemes, $HNO_2$ is representing one of these products in the stoichiometry.

The liquid solution 9 from plasma synthesis is pressurized by a pump 10 and used as motive fluid 12 and product 13. This dilute product solution 13 can further be taken into an oxidization tower 22 where a surplus of air with oxygen is completing the reactions to the right composition of nitric acid $HNO_2$, and nitrous acid, $NHO_2$.

The pressure in the plasma synthesis is given by the sum of the partial pressures of the water and the volatile components in the watery solution. In an acidic dilute and cold watery solution, the vapor pressure of water will dominate the absolute pressure. At 25° C. the vapor pressure of water is 0.03 bar, which gives 30% $H_2O$ in a gas or plasma phase at 0.1 bar, and 15% $H_2O$ in a gas or plasma phase of totally 0.2 bar. The condenser 6 using cooling water 7 controls the temperature of the pressure giving watery solution.

The reaction from air feed with water, carbon dioxide gas or carbonate minerals goes in four steps:
1) Plasma generation.
2) Quenching. The direct formation of plasma products from the plasma generated from the feed and the gas components in the quenching gas.
3) Absorption. The direct reaction between plasma products and the watery liquid phase used for quenching and absorption.
4) The secondary oxidization and reabsorption reactions in gas phase and watery phase.

Plasma Generation

In a mix of air, water and carbon dioxide, the number of relevant plasma products for the simulation is 49 and the number of equations describing them is 303. Table 1 is showing a simplified chemical description representing the plasma reactions. Table 3 gives an overview and description of all the feed gas components and the plasma products. Table 4 gives an overview of definitions.

TABLE 1

Reactions from feed gas components to plasma products.

| | | |
|---|---|---|
| $N_2 =$ | $N + N$ | IV |
| $O_2 =$ | $O + O$ | V |
| $H_2O =$ | $2H + O$ | VI |
| $N + O =$ | $NO$ | VII |
| $2NO + O_2 =$ | $2NO_2$ | VIII |
| $N + 3H =$ | $NH_3$ | IX |
| $CO_2 =$ | $C + O + CO$ | X |

The plasma generation will take place within $10^{-6}$ to $10^{-3}$ seconds. The energy input is coming from accelerated electrons, and the energy will initially convert the gas molecules to energy rich plasma components. Towards the end of the plasma generation zone, the plasma components will start to form new reactive plasma gas products, releasing thermal energy.

The energy efficiency of the overall process depends on the yield of reactive NOx components relative to the generated plasma components. In the pilot plant testing the yield has been as good as 23%, giving an energy efficiency of 100 GJ/tN.

Reaction Equations from Quenching to Products in Solution.

The reactions starting from air ending with $HNO_{3(aq)}$ and $NH_4OH_{(aq)}$ has different paths depending on plasma composition, retention time in the various reaction phases, and in our experiments and simulations the following concepts have been studied:

1) Air plasma quenched with water or steam
2) Nitrogen plasma quenched with water
3) Air plasma quenched with carbon dioxide
4) Air plasma quenched with a carbonate mineral
5) Air plasma enriched with oxygen quenched with water Reducing the Pressure in the Closed Loop Reducing the pressure in the closed loop requires that:
1) The volume is expanded. Ref. the gas law PV=nRT.
When V increases while T is constant, P will decrease.
This change requires that physical work is performed, and in a dynamic process this work is performed continuously.
2) The temperature is lowered. Ref. the gas law PV=nRT.
When T decreases and V is constant, the pressure will decrease until there is established a new equilibrium according to the gas law.
This change therefore requires that a continuous physical work is performed in a dynamic process.
3) The number of gas molecules n is reduced. Ref. the gas law nRT=PV.
When n drops and V is constant, P will drop.
This change requires a phase change, and when the phase change from gas to solid or liquid arises from removal of energy, the formation of low pressure, or vacuum, becomes free.
The phase change can be maintained as a continuous process when the liquid having the absorbed product can be pumped out.
The costs of pumping a liquid is far lower than the energy required to pump out the gas having a volume that is 10 times the volume of the liquid.

Controlling the Pressure in the Closed Loop

Controlling the pressure in the closed loop requires that:
1) The composition of the critical inert gas reactants ($O_2$ and $N_2$) must be controlled to the stoichiometric correct ratio which gives the highest reaction rate.
2) When there are two feed gas components, one of them must be able to be controlled independently of the other. In the process according to the present invention, the $O_2$ content is analyzed and the $N_2$ and $H_2O$ contents are calculated.
3) In principle, the feed flows should always give the stoichiometric ratio as that of the outgoing product.
4) The reaction rate optimization is performed by an intelligent feedback controller where:
  a. The pressure obtained is a function of the composition in the loop, and the loop is in principle fed as a function of the average best ratio.
  b. If the pressure rises relative to what can be explained by other parameters, a change in composition is made.
  c. The controller monitors the change, with regard to the development of pressure and temperature over a given time interval.
  d. The controller then performs the following:
    i. If the pressure change (the derivative) changes in the correct direction but continues to change more slowly, the rate is adjusted in the same direction.
    ii. If the pressure change changes in the wrong direction, the rate is adjusted in the opposite direction.
    iii. If the pressure change stops or changes sign (starts to fall) no further adjustment is made.

In practice, if the feed gas is air, oxygen will be controlled. Then, extra $O_2$ is added to adjust the stoichiometry.

DETAILED DESCRIPTION OF FIGURES

The numbering in all figures is following the same functional service. In the figures, 3.1 and 3.2 refer to parts of the preheating chamber 3, 4.1 and 4.2 refer to parts of the plasma generator 4, and 5.1 and 5.2 refer to parts of the ejector 5.

Figure 1A:
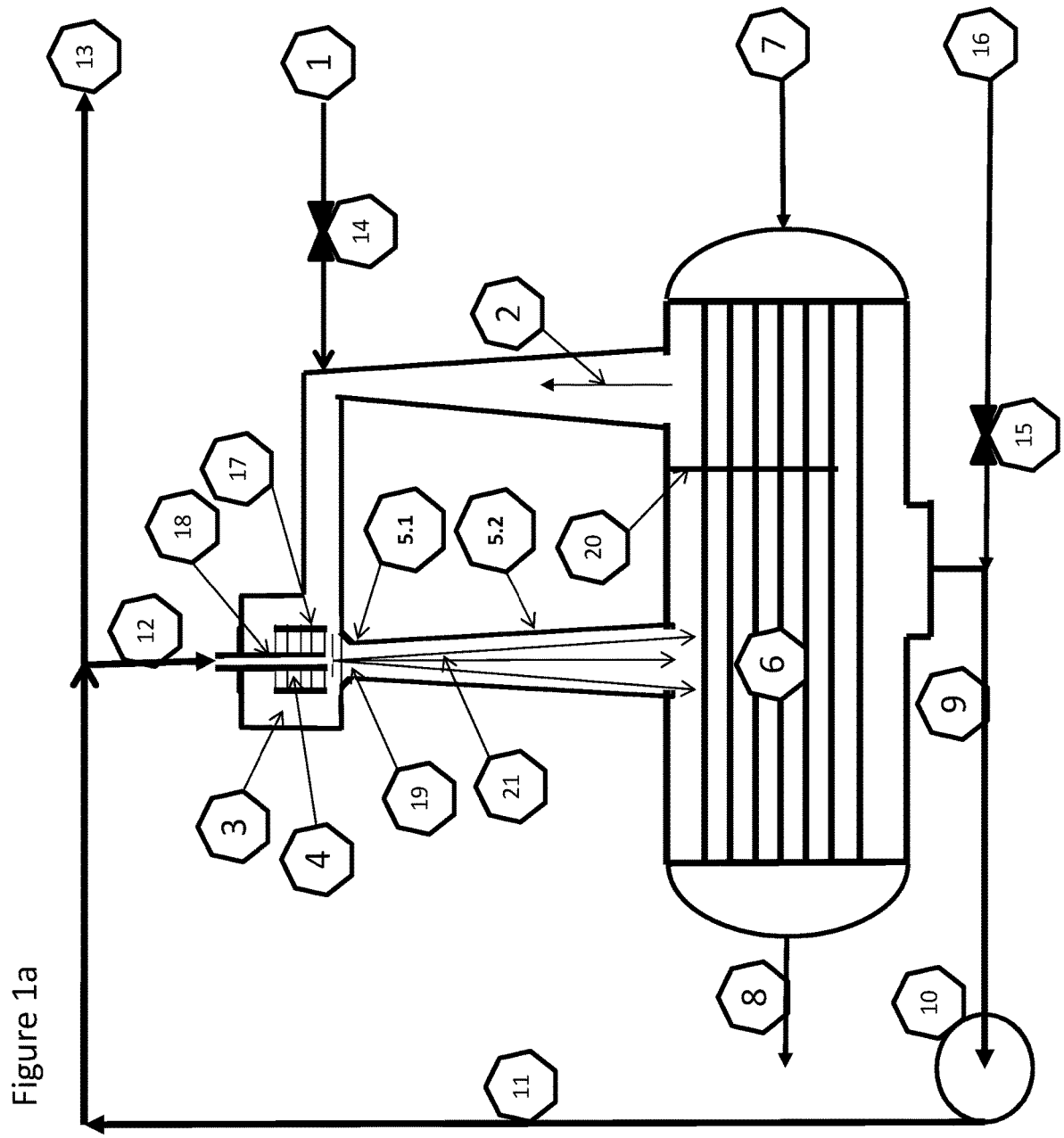

FIGS. 1, 1a, b and c

The low pressure plasma synthesis system comprises a plasma generator 4, an ejector 5, a condenser 6 with a baffle plate 20 and a pump 10 for circulating the watery solution from the condenser to use it as motive fluid in the ejector 5. Fresh feed gas 1 and recycled gas 2 is taken in through the preheating chamber 3 before going through the plasma generator 4 and sucked down through the ejector 5. The motive medium in the ejector is flow 12 of motive fluid. The circulation pump 10 gives the motive pressure of flow 12. The plasma and the quenching gas at 19, is sucked into the ejector by the velocity of the motive fluid 21. The system pressure is controlled by valve 14,14.1,14.2, which is controlling the fresh feed 1,1.1,1.2. The mass balance and level is controlled by the feed of fresh water 16 using control valve 15. The recycle gas 2 is saturated with water vapors according to the temperature of the cooling water 7. The minimum condenser pressure is given by the cooling water outlet temperature 8. In the preheating chamber 3, the waste heat from the electrode, in this case only the outer electrode 17, preheats the feed to the plasma unit. The inner electrode 18 is connected to the nozzle tube 18 for the motive fluid 12. See FIG. 2 for more details. The solution 9 leaving the condenser 6 is pumped up to the motive pressure in flow 11. Flow 11 is feeding the ejector 5 with motive fluid 12 and delivering the product 13.

FIG. 2

FIG. 2 shows the details of a typical dielectric barrier discharge or electro-magnetic wave plasma generator and the ejector nozzle. The ejector is circulating both the liquid and the gas in the closed plasma synthesis loop. The gas feed to the ejector is both fresh feed 1 and recycle gas 2. In FIG. 2, the feed flows are numbered 1.1, 1.2 and 1.3. The outer electrode 17 preheats recycle flow 1.2 before entering the plasma zone at 4.1 or is used as quenching gas 1.3. The inner electrode preheats feed flow 1.1 before it is entering the plasma zone at 4.1. Flow 1.3 is not preheated and is serving as a quenching gas for the plasma from 4.2. Flow 1.3 and plasma from 4.2 is mixed before and in 19. The motive fluid pressure at 12 is converted to velocity in the jet 21. The velocity is lowering the pressure and driving both gases and liquids down the expansion channel of ejector 5.

Figure 3A:
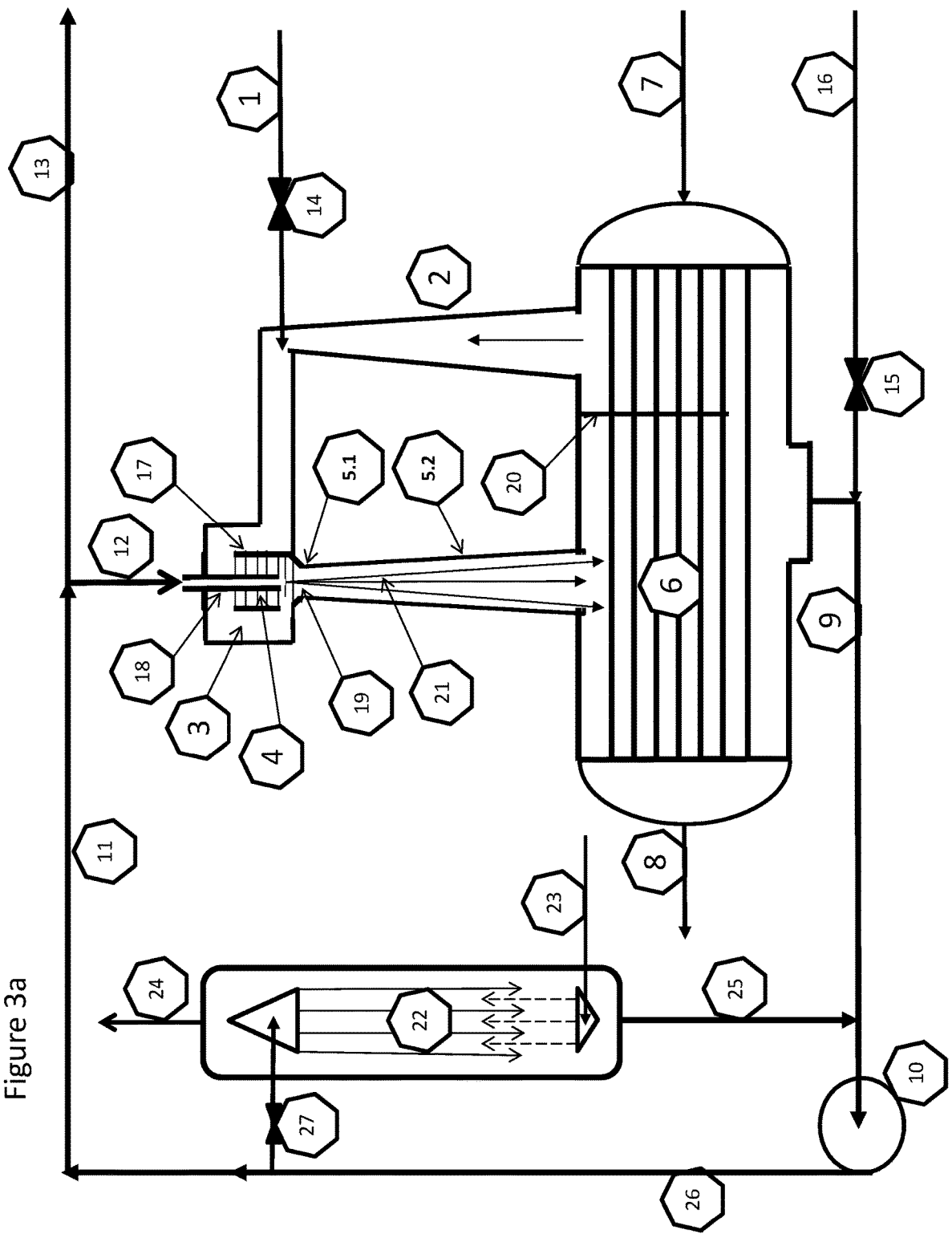
FIGS. 3a-c are showing how an oxidation tower is added to the low-pressure plasma synthesis loop. The oxidation tower is only connected to the liquid side of the loop and can be operated at higher pressure, typically atmospheric pressure.
Figure 3B:
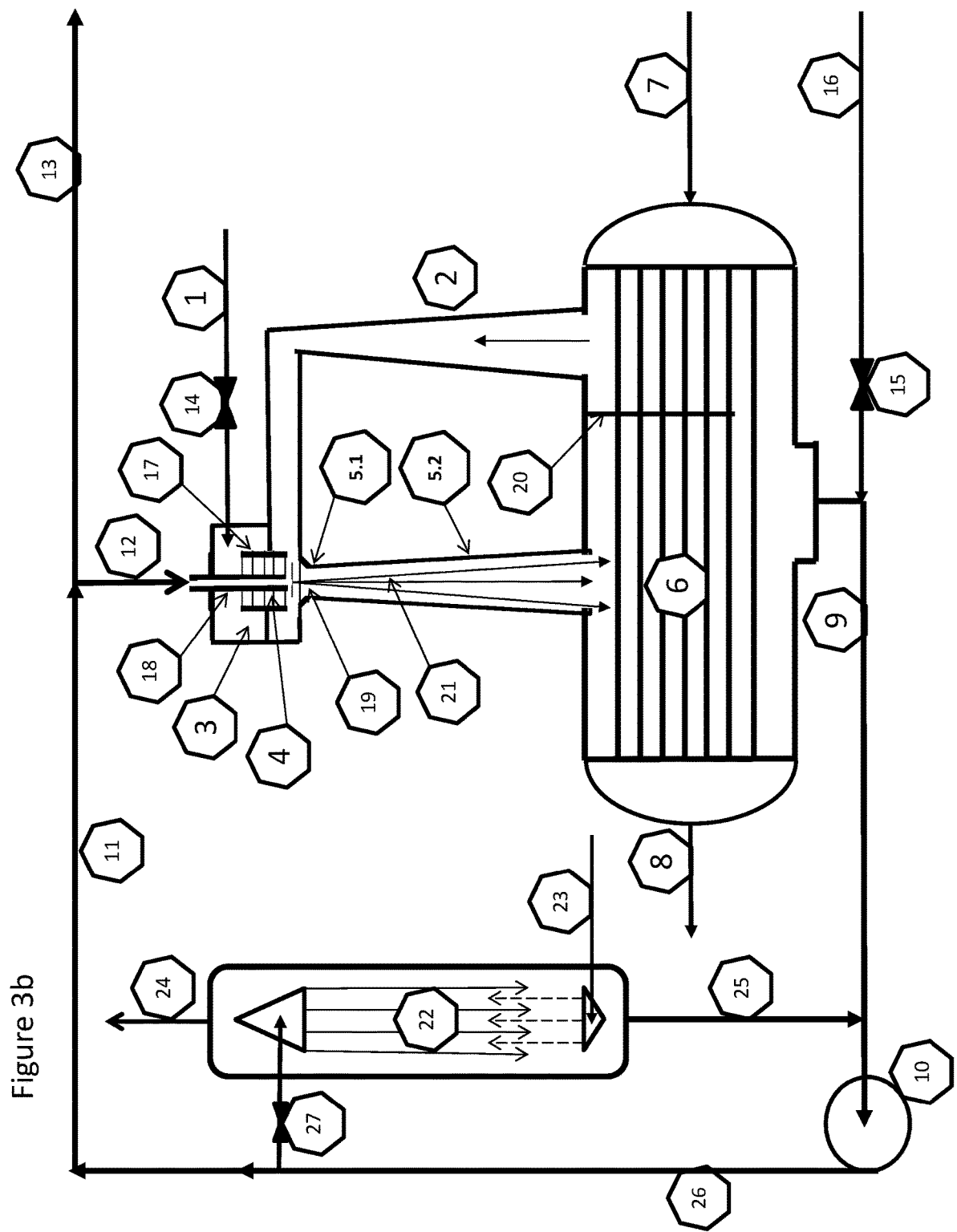
Figure 3C:
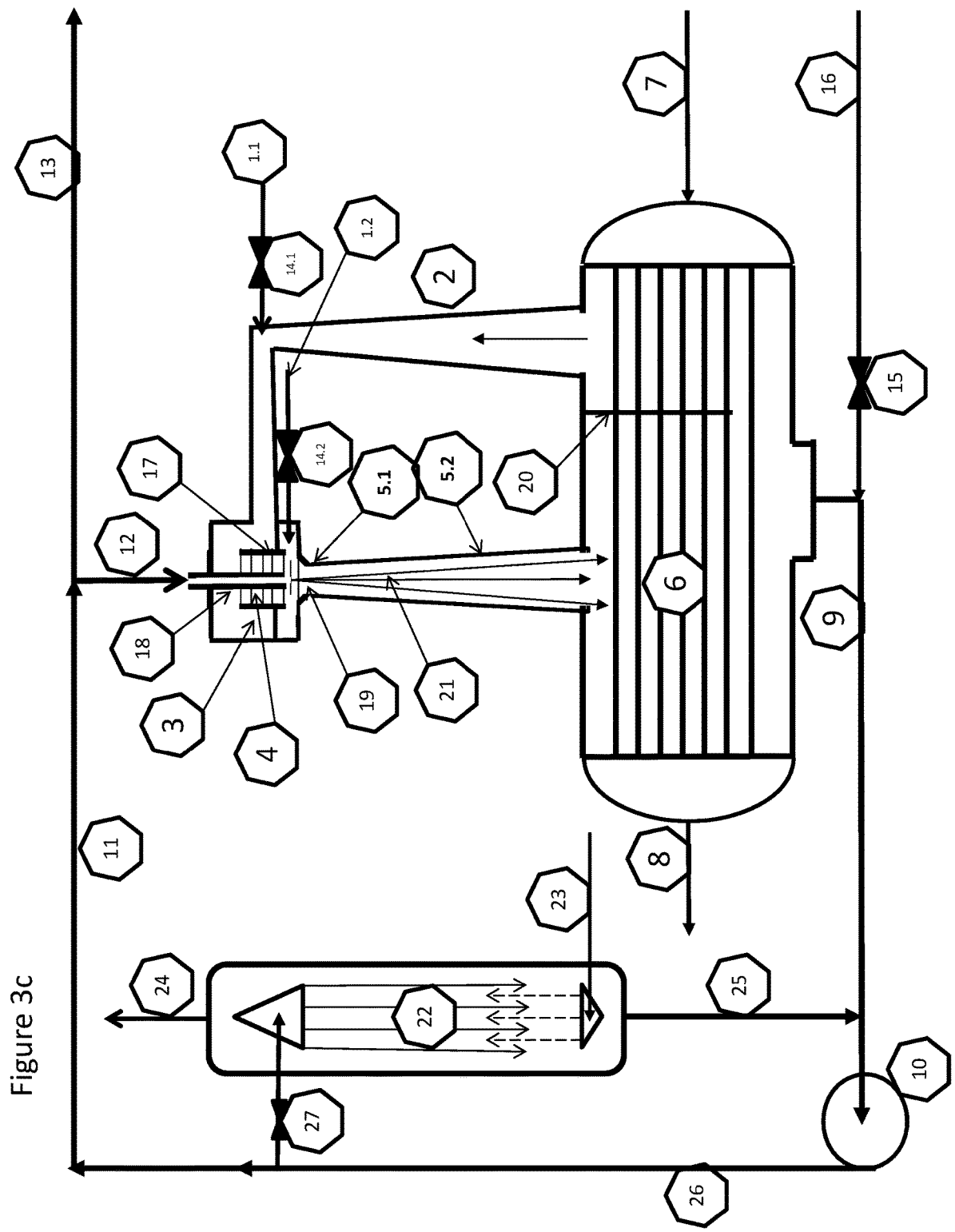

FIGS. 3 a, b and c.

Figure 4:
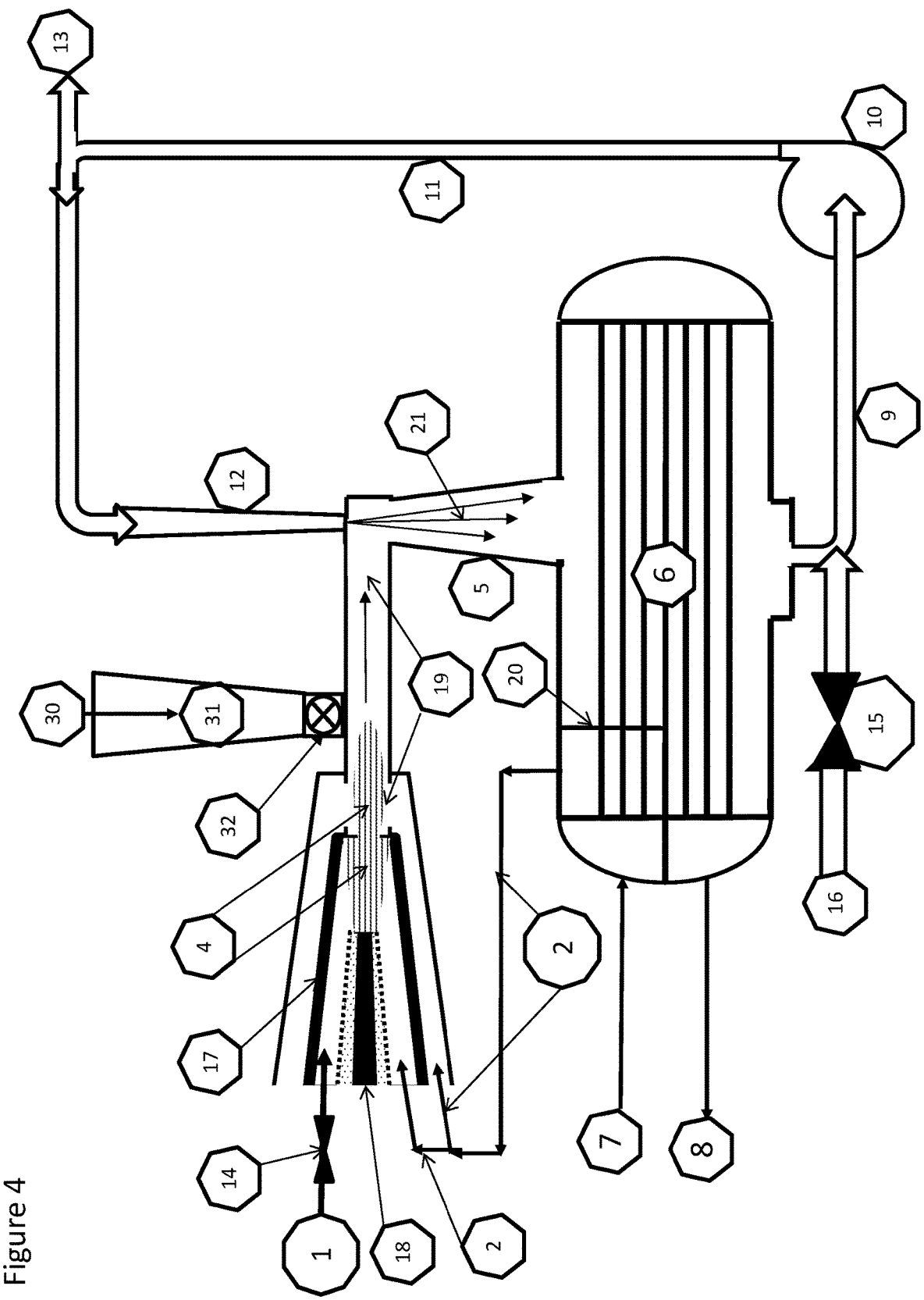
FIG. 4 is showing how a carbonate mineral is used to quench the plasma and provide oxygen to the NO formation.

FIGS. 3 a, b and c are based on FIG. 1 with the addition of the oxidation tower 22. The low pressure plasma synthesis system comprises a plasma generator 4, an ejector 5, a condenser 6 with a baffle plate 20 and a pump 10 for circulating the water from the condenser to use it as motive fluid in the ejector 5. Fresh feed gas 1 and recycled gas 2 are taken in through the preheating chamber 3 before going through the plasma generator 4 and sucked down through the ejector 5. The motive medium in the ejector is flow 12. The circulation pump 10 gives the motive pressure of flow 12. The plasma and the quenching gas at 19, is sucked into the ejector by the velocity of the motive fluid 21. The system pressure is controlled by valve 14,14.1,14.2, which is controlling the fresh feed 1,1.1,1.2. The mass balance and level is controlled by the feed of fresh water 16 using control valve 15. The recycle gas 2 is saturated with water vapors according to the temperature of the cooling water 7. The minimum condenser pressure is given by the cooling water outlet temperature. In the preheating chamber 3, the waste heat from the electrode, in this case only the outer electrode 17, preheats the feed to the plasma unit. The inner electrode 18 is connected to the nozzle tube 18 for the motive fluid 12. See FIG. 2 for more details. The solution 9 leaving the condenser 6 is pumped up to the motive pressure in flow 26. Flow 26 is feeding the oxidation tower 22 through valve and line 27 and flow 11 is feeding the ejector 5 with motive fluid 12 and delivering the product 13. In the oxidation tower 22, the liquid feed 27 is fed to the top where it is meeting a surplus of gas 23 which is fed in to the bottom of the oxidation tower 22. The liquid 25 leaving the oxidation tower is fully oxidized. All $HNO_2$ is oxidized to $HNO_3$. The gas 24 leaving the oxidation tower is depleted in oxygen. FIG. 4

FIG. 4 is showing how the low-pressure plasma synthesis system can be used in the process including solid reactants. The fresh feed gas 1 is going through the plasma generator 4 between the inner electrode 18 and the outer electrode 17. The plasma generated is extending outside the outer electrode and is meeting the secondary recycled gas 2 in 19. The gas mix is also mixed with the powder flow of the carbonate mineral 30 from the power bin 31 fed into 19 through the rotary wheel 32. The gas and powder mix is thereafter quenched in the ejector 5 driven by the motive liquid 12 and sprayed down into the condenser 6. The pump 10 takes the pressure from flow 9 up to motive pressure in flow 11 in order to circulate the water from the condenser and use it as motive fluid 12 in the ejector 5 and to discharge the product 13 from the loop. Fresh feed gas 1 can optionally be mixed with recycled gas 2 and used as primary gas.

Figure 5:
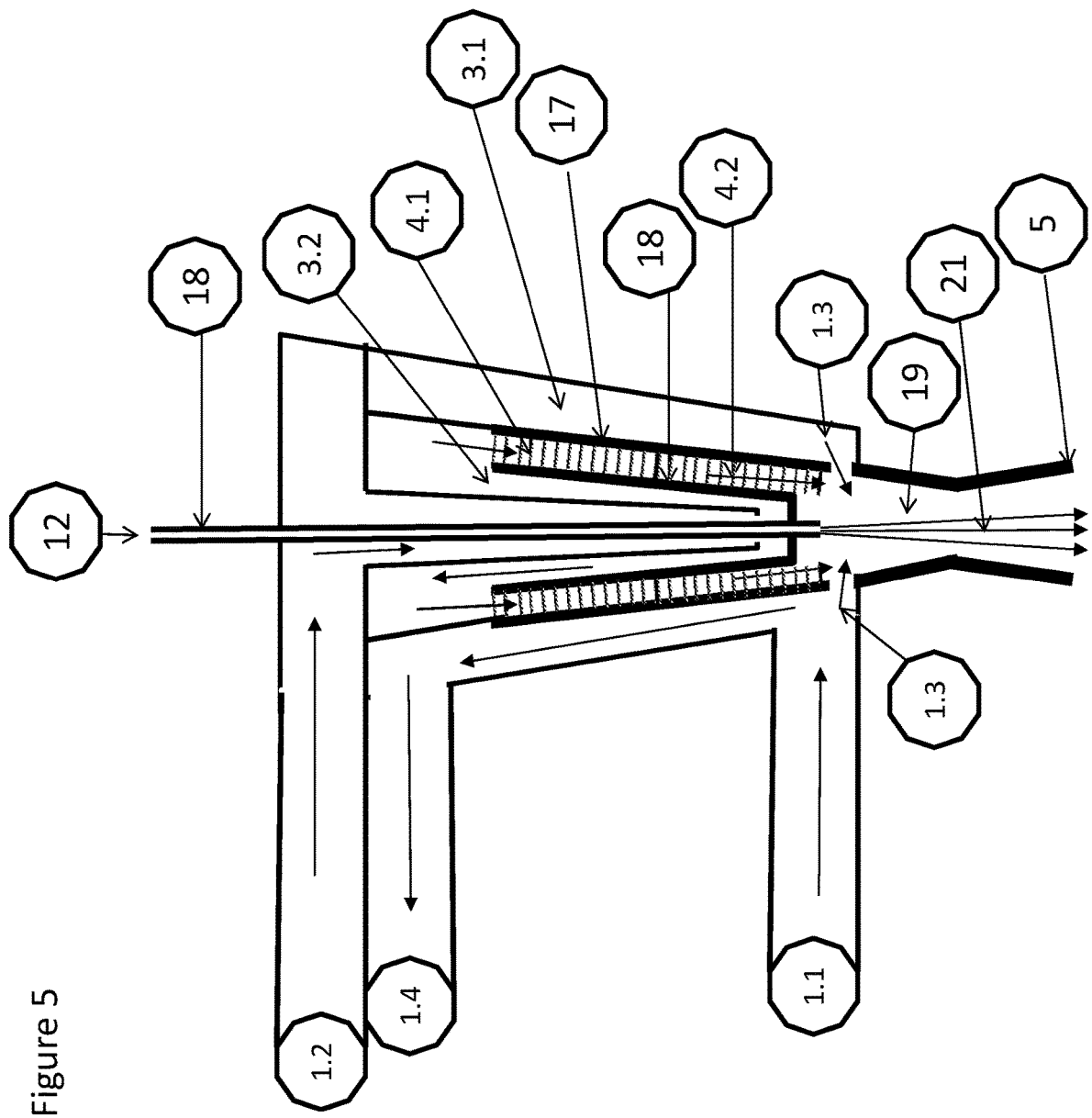
FIG. 5 is showing how oxygen-conducting membranes can be combined with the plasma generator and ejector.

The system pressure is controlled by the fresh feed gas 1 through valve 14. The mass balance and level is controlled by the feed of fresh water 16 using control valve 15. The recycle gas 2 is saturated with water vapors according to the temperature of the cooling water 7. The minimum condenser pressure is given by the cooling water outlet temperature 8. FIG. 5

FIG. 5 shows how oxygen-conducting membranes can be combined with the plasma generator and the ejector. The ejector is circulating both the liquid and the gas in the closed plasma synthesis loop. As seen in FIG. 1 the gas feed to the ejector is both fresh feed 1 and recycle gas 2. In FIG. 5, the feed flows to the plasma generator are numbered 1.1 for fresh oxygen rich gas, 1.2 for recycled gas 2 and 1.3 is fresh and or recycled gas for quenching. The outer electrode 17 is also an oxygen membrane where feed flow 1.1 is releasing oxygen into the plasma zone 4.1 before being released to atmosphere 1.4. The inner electrode preheats recycle flow 1.2 before it is entering the plasma zone at 4.1. Feed or recycle flow 1.3 is not preheated and is serving as a quenching gas for the plasma from 4.2. Flow 1.3 and plasma from 4.2 are mixed in 19. The motive fluid pressure at 12 is converted to velocity in the jet 21. The velocity is lowering the pressure and driving both gases and liquids down the expansion channel of ejector 5.

Example 1. Plasma from Air and Water

The fresh feed air 1 to the plasma synthesis loop can be fed in 1.1 to the plasma zone 4.1 and the recycle gas 2 containing nitrogen and steam from the condenser 6 can be used as quenching air 1.3. The fresh feed can alternatively be directed to 1.2 as quenching gas 1.3 with steam and surplus of nitrogen in 2 from the condenser 6. Both alternatives are although locked to the following stoichiometries:

$$8N_2+2O_2+7H_2O=7NO+3NO_2+6NH_3 \qquad \text{XII}$$

The stoichiometric absorption step may also take additional oxygen from water to form the intermediate acidic products:

$$8N_2+2O_2+22H_2O=8HNO_3+HNO_2+7NH_4OH \qquad \text{XIII}$$

The full mass balance from air, steam and water is giving an alkaline solution if there is no extra oxygen provided:

$$8N_2+2O_2+26H_2O=7HNO_3+9NH_4OH \qquad \text{XIV}$$

The results and simulations show that the reaction path according to equation XII is the dominant one for the conditions acquired in the loop and described herein. The ratio between NOx and NHx is clearly on the acidic side, and the reaction in the oxidation tower 22 going from XV goes like:

$$7NO+3NO_2+6NH_3 \qquad \text{XV}$$

$$+24N_2+6O_2+11H_2O=10HNO_3+6NH_4OH+24N_2 \qquad \text{XVI}$$

Example 2. Nitrogen Plasma Quenched with Water or Steam

Equation XVII indicates the potential for a significant surplus of Nitrogen, due to the initial N to O ratio in air. This means that it can be possible to feed in 1.1 the plasma zone 4.1 with pure nitrogen and quench it with water.

$$4N_2+10H_2O=2NO+2NO_2+8NH_3 \qquad \text{XVII}$$

The products from XVII is directly absorbed in water according to:

$$2NO+2NO_2+8NH_3+10H_2O=4HNO_{2(aq)}+8NH_4OH_{(aq)} \qquad \text{XVIII}$$

The nitrous acid $HNO_2$ is further oxidized in the oxidation tower 22 where the reaction to nitric acid is completed. The oxidizer receives a surplus of air and there is a stoichiometric surplus of nitrogen which will be released to the atmosphere:

$$4HNO_{2(aq)}+8NH_4OH_{(aq)}+2O_2+8N_2=4HNO_{3(aq)}+8NH_4OH_{(aq)}+8N_2 \qquad \text{XIX}$$

Example 3. Air Plasma Quenched with Carbon Dioxide

Air plasma quenched with $CO_2$ give from the overall stoichiometry the two main products, $HNO_3$ and carbon as $C_2$ and $C_3$. From FIG. 1c, the carbon dioxide feed in 1.2 will provide enough oxygen for the air fed in 1.1 for a full oxidation to nitric acid inside the plasma synthesis, obsoleting the oxidation loop giving an overall mass balance:

$$8N_2+2O_2+8H_2O+5CO_2=C_2+C_3+16HNO_{3(aq)} \qquad \text{XX}$$

Alternatively, the carbon dioxide is fed in 1.1 and the air is fed in 1.2.

Inside the oxidation loop however, the active carbon components will eliminate the free oxygen and the reaction path will be dominated by the recycled nitrogen and carbon dioxide:

$$N_2+CO_2+H_2O=\tfrac{1}{2}C_2+2HNO_{3(aq)} \qquad \text{XXI}$$

The carbon molecules will precipitate in the water and follow the product out as active carbon.

Example 4. Air Plasma Quenched with a Carbonate Mineral

The combination of quenching with a solid material containing carbonates gives a very elegant overall mass balance. The magnesite, limestone or dolomite is providing the carbonate with the oxygen for the nitrate. Oxygen will probably not be present. Oxygen and reactive carbon will form $CO_2$. The reaction path can be described as:

$$4N+2Mg(CO_3)_2=C_3+CO_2+2MgO+4NO_2) \quad\quad XXII$$

$$2MgO+4NO_2+C_3+CO_2=2Mg(NO_3)_{2(aq)}+C_3+CO_2 \quad\quad XXIII$$

In practical operation, the quenching with a carbonate mineral will be a mix of reaction XXI and XII+XXIII and the net reaction in the plasma loop will be:

$$22N_2+5O_2+2H_2O+20Mg(CO_3)_2=20Mg(NO_3)_{2(aq)}+ 4HNO_3+20C_2 \quad\quad XXIV$$

the extra oxygen. High temperature oxygen permeable membranes can be installed in the quenching zone, where the low-pressure plasma will pick up the oxygen from the oxygen membrane surface and air will deliver the oxygen for transport through the membrane. The total mass balance for production of nitric acid will be:

$$2N_2+5O_2+2H_2O=4HNO_{3(aq)} \quad\quad XXV$$

Experimental Test

Figure 1B:
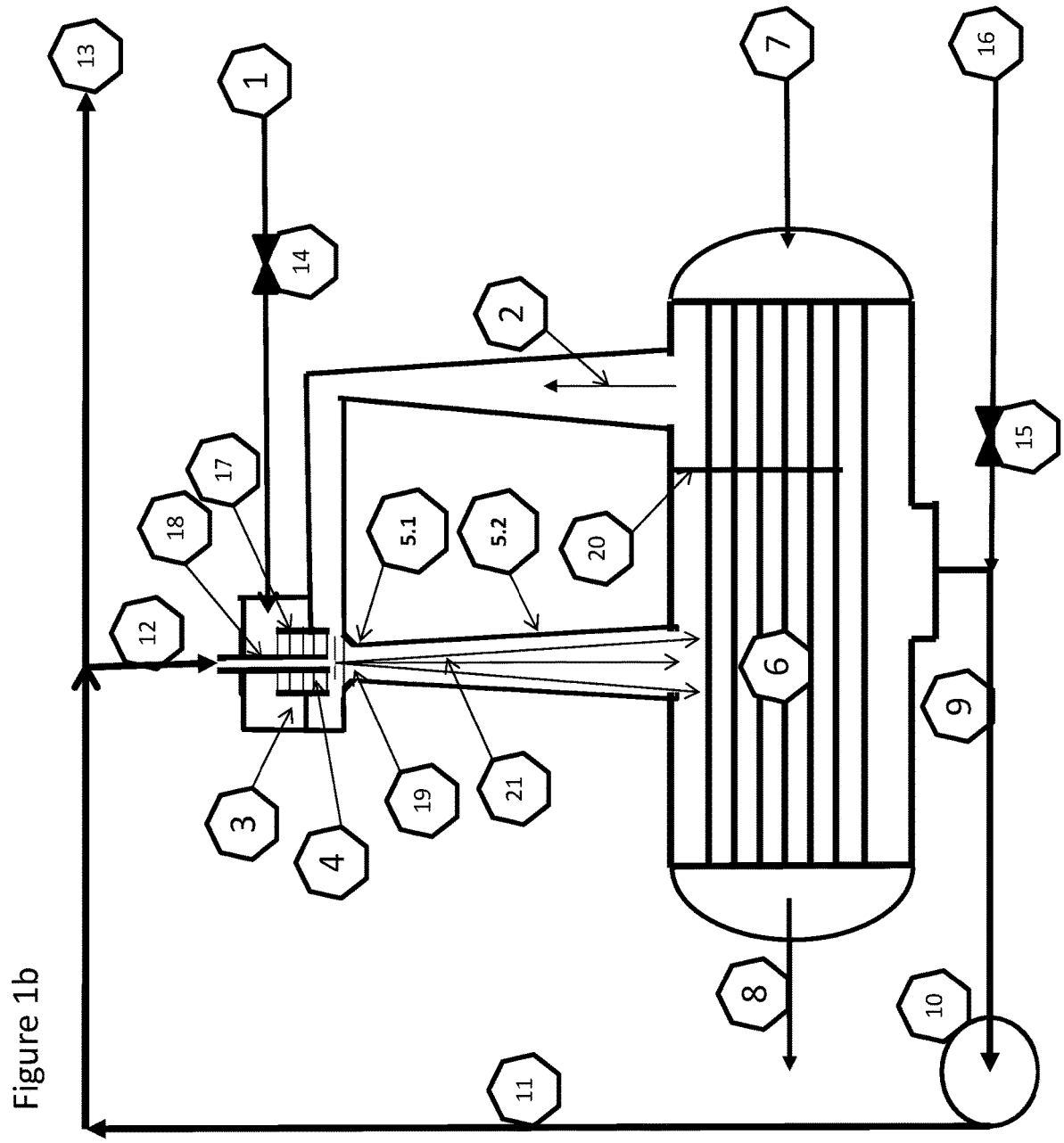
Figure 1C:
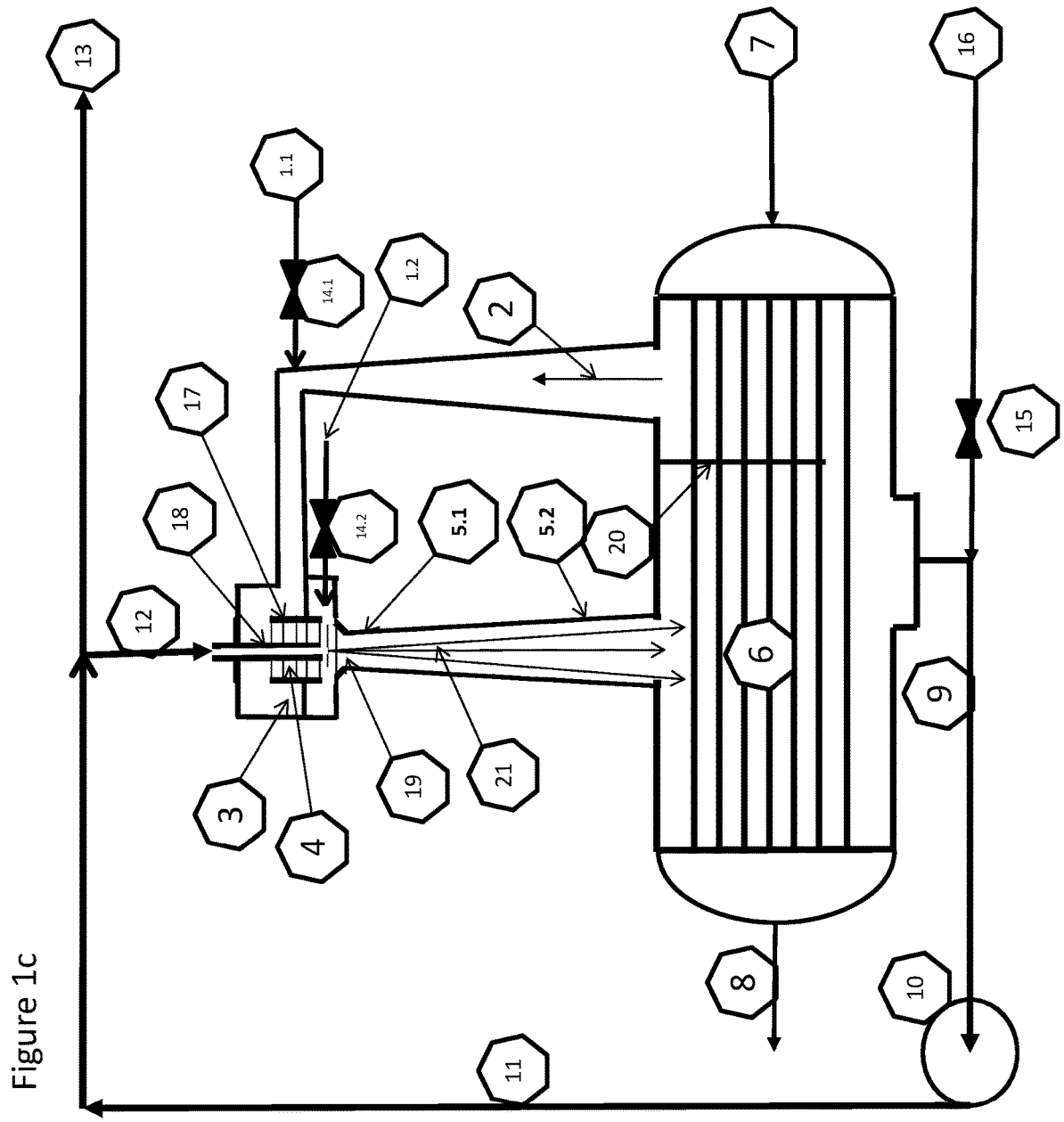

A mass and energy balance has been carried out for the system described in FIG. 1b. The results obtained are shown in the below table 2.

TABLE 2

| | \multicolumn{6}{c|}{Test of system described in FIG. 1b} |
|---|---|---|---|---|---|---|
| | \multicolumn{6}{c|}{Flow nr} |
| | 1 | 2 | 3 | 4 | 4 + 2 = 19 | 12 |
| | \multicolumn{6}{c|}{Phase} |
| | Gas/Plasma N-litre/min | Gas/Plasma N-litre/min | Gas/Plasma N-litre/min | Gas/Plasma N-litre/min | Gas/Plasma N-litre/min | Aqueous g/min |
| N2 | 1.00 | 10.01 | 1.00 | 0.05 | 8.9151 | |
| O2 | 2.50 | 25.01 | 2.50 | 0.13 | 22.5733 | |
| N | | | | 1.90 | 3.8024 | |
| O | | | | 4.75 | 9.5059 | |
| H | | | | 0.0007 | 0.0014 | |
| OH | | | | 0.0007 | 0.0014 | |
| NO | | 0.0005 | | | 0.3807 | |
| NO2 | | 0.0005 | | | 0.0005 | |
| HNO2 | | | | | | 41.67 |
| HNO3 | | | | | | 4167 |
| NH3 | | | | | | |
| H2O | 0.04 | 2.39 | 0.04 | 0.035 | 2.42 | 83333 |
| Total | 3.62 | 37.41 | 3.54 | 13.66 | 89.93 | 87542 |
| Temperature; K | 300 | 313 | 400 | 10193 | 590 | 313 |
| Pressure; kPa | 100 | 100 | 100 | 100 | 100 | 600 |
| Enthalpy flow; J/s | −4 | −392 | 3 | 3000 | 2996 | −22040000 |
| | \multicolumn{6}{c|}{Flow nr} |
| | 19 + 12 = 21 | 6 | | | 13 | 16 |
| | \multicolumn{6}{c|}{Phase} |
| | Aqueous g/min | Gas/Plasma N-litre/min | Aqueous g/min | Gas/Plasma N-litre/min | Aqueous g/min | Aqueous g/min |
| N2 | | 8.9151 | | 10.01 | | |
| O2 | | 22.5733 | | 25.01 | | |
| N | | 3.8024 | | | | |
| O | | 9.5059 | | | | |
| H | | 0.0014 | | | | |
| OH | | 0.0014 | | | | |
| NO | | 0.381 | | 0.00050 | | |
| NO2 | | 0.001 | | 0.00050 | | |
| HNO2 | 41.67 | 0.00 | 42 | | 0.06 | |
| HNO3 | 4167 | 0.00 | 4173 | | 5.57 | |
| NH3 | | 0.00 | | | | |
| H2O | 83333 | 2.42 | 83333 | 2.39 | 113 | 113 |
| Total | 87542 | 48 | 87548 | 37 | 118 | |
| Temperature; K | 313 | 313 | 313 | 313 | 313 | 313 |
| Pressure; kPa | 100 | 100 | 100 | 100 | 100 | 100 |
| Enthalpy flow; J/s | −22039715 | 2712 | −22040320 | −392 | −29751 | −29459 |

Example 5. Air Plasma Enriched with Oxygen Quenched with Water

Feeding extra oxygen will give the correct stoichiometry for pure nitric acid production. Commercial membrane technology or cryogenic air separation techniques can give The result of the low pressure plasma reactor closed loop process is described using flow numbers corresponding to the flows in FIG. 1b.

Feeding a fresh feed gas flow 1 and a fresh absorption liquid flow 16 to the closed loop; preheating 3 the feed gas flow and passing it through the plasma generator 4, thereby generating a plasma-containing gas; quenching the plasma-containing gas from the plasma generator with a quenching flow at 19; further cooling and absorbing the quenched plasma-containing gas into the ejector feed flow making a mixed flow liquid while forming reaction products, thereby reducing the pressure in the closed loop due to the absorption of the plasma-containing flow into the absorption liquid; and (e) removing at least part of the absorption liquid containing the reaction products from the closed loop as a product flow 13. The feed gas 1 volume and feed absorption liquid 16 is extracted from the loop as a liquid product 13.

Design and Operational Features

Plasma Generation

The energy of the electrons is initially generating the plasma. The electrical field and a low density of the gas is a precondition for the energy of the electrons. The temperature and pressure is giving the density of the gas. Preheating the gas and or lowering the pressure enables the arc and plasma to be generated with a lower electrical field.

A long retention time in the plasma generation field is completing the plasma generation and starting the back reactions to gas releasing energy creating temperature.

Quenching Gas

The quenching gas is normally both taking up excitation and kinetic energy as well as reacting with the plasma and gas components. The quenching gas can turn into plasma if the required energy for its excitation is available. The quenching gas should in the end become part of the liquid phase, either on its own or by reacting with other components.

Quenching Solids

Quenching with solids is effective in cases where the right reaction stoichiometry is in place in the plasma, and a pure quenching effect is required. The higher Cp per unit volume makes solids a good quenching agent.

Quenching Liquid

Quenching with liquids is also an effective way of quenching. The heat of evaporation is keeping the temperature down, and the vapour phase created can participate in the reactions towards other absorbable components or just precipitate by condensation.

Pressure Control

The conversion of gases to liquid or solid phase is reducing the total volume and reducing the pressure in the closed loop. The volume feed of gases has to be converted to liquid volume and extracted as liquid at a rate faster than the feed volume rate. The pressure shall in such case drop as a function of time if the stoichiometry is correct and the feed flow is matching the product flow. In most of the cases, the stoichiometry from feed to reaction products will adjust itself. The air and water ratio will in the end make stoichiometric ratio between ammonia $NH_3$ and nitric acid $HNO_3$. More water in the vapour phase gives more ammonia and more air and oxygen give more nitric acid and nitrous acid.

TABLE 3

| | Description of components |
|---|---|
| $N_2$ | is nitrogen gas, the main component of air, ca 78% |
| $O_2$ | is oxygen gas, the next most important component of air, 21% |
| $H_2O$ | is a normal component of air. In saturated air the water content is ranging from 3% at 24° C. to 10% at 46° C. |
| $CO_2$ | is carbon dioxide gas, a component in air, 350-500 ppm, and a combustion product from burning fossil fuels |
| CO | is carbon monoxide, a component formed from $CO_2$ at high temperature and low oxygen concentration |

TABLE 3-continued

| | Description of components |
|---|---|
| N | is representing all the nitrogen plasma components and radicals from $N_2$ |
| O | is representing all the oxygen plasma components and radicals |
| C | is a carbon radical able to form solid carbon structures $C_n$ |
| $C_2$ & $C_3$ | is a high-energy short-lived carbon gas molecule able to form solid carbon structures $C_n$ |
| OH | is one of the plasma radicals from $H_2O$ |
| H | is the hydrogen plasma radical |
| NO | is nitrogen-oxide, the first product from N and O |
| $NO_2$ | is nitrogen dioxide, the next nitrogen oxidation step from NO gas |
| NO$x$ | is a mix of NO and $NO_2$ |
| $HNO_2$ | is nitrous acid, the first product from NO and $NO_2$ absorption in water |
| $HNO_3$ | is nitric acid, the next reaction product after $HNO_2$ oxidation in water |
| $NH_3$ | is ammonia, the common reaction product from H and N plasma |
| NH$x$ | is a mix of NH, $NH_2$, and $NH_3$ |
| $NH_4OH$ | is aqueous ammonia which is ammonia absorbed in water |
| $NH_4NO_3$ | is ammonium nitrate, the neutral soluble salt of ammonia and nitric acid |

TABLE 4

| | Definitions |
|---|---|
| % | is percent by mole |
| K | is absolute temperature in Kelvin |
| ° C. | is Centigrade according to the Celsius scale |
| Bar | is bar absolute. 1 bar = 100,000 Pascal |
| GJ | is Giga Joule = 1,000,000,000 Joule |
| tN | is metric tonnes of Nitrogen |
| $\Delta H_f$ | is delta heat of formation for the reaction |
| $\Delta G_f$ | is delta Gibbs free energy for the reaction |
| $HNO_3$ | is Nitric Acid |
| E | is the electric field (kV/cm) |
| N | is the number of molecules in one $cm^3$ |
| Td | is the field strength E divided by the neutral molecule density N giving the reduced field strength |

Plasma Reactor Loop or Plasma Synthesis Loop (FIG. 1)

An integrated system combining a reactor with other unit operations like cooling, heating, condensation, evaporation and different separation techniques normally at same pressure, to convert a feed to a chemically and or physically different component.

Plasma Generator or Electric Arc (4)

The zone between the electrodes where the electrons are accelerated through the gas making plasma components on impact.

Condenser (6)

The cooler where the first product gases are cooled and absorbed in the solution.

Ejector (5)

A liquid motive fluid at high pressure is jetted through a gas volume in to a venturi carrying along the gas into the downstream unit where the pressure can be higher.

Oxidation Tower (22)

An absorption tower where the gas meet liquid in a counter current to in-crease the contact and mass transfer between gas and liquid. The oxidation takes place in the gas and liquid.

Oxygen Conducting Membrane (17)

A membrane able to selectively transport Oxygen as $O_2$, O or $O^{2-}$ from one side to the other. The driving force can be the partial pressure or activity of the sum of pure oxygen components. Electricity can also be applied as a driving force for oxygen ions $O^{2-}$.

The invention claimed is:

1. A plasma reactor closed loop process generating low pressure, comprising:
   feeding a fresh feed gas flow and a fresh feed absorption liquid flow to a plasma reactor closed loop comprising a condenser, a liquid loop, a recycle gas loop, and a plasma generator;
   converting feed gas to reactive plasma products in the plasma generator;
   quenching and absorbing the reactive plasma products into an absorption liquid circulating in the liquid loop where the reactive plasma products react to form liquid reaction products, thereby generating low pressure in the closed loop;
   monitoring composition and low pressure of the recycle gas loop and, if the low pressure increases, adjusting composition of the fresh feed gas flow and/or fresh feed absorption liquid flow to bring the composition of the fresh feed gas flow towards stoichiometric ratio with the absorbed reactive plasma products;
   at least part of the circulating absorption liquid, containing the liquid reaction products, is extracted from the plasma reactor closed loop as a product flow;
   wherein the generated low pressure is less than 1.2 bar.

2. The process according to claim 1, wherein the composition and low pressure is monitored by a controller.

3. The process according to claim 1, wherein the flow of the fresh feed gas and/or the flow of the fresh feed absorption liquid is adjusted if the low pressure increases.

4. The process according to claim 1, wherein the generated low pressure is less than 1.0 bar.

5. The process according to claim 1, wherein the low pressure in the recycle gas loop is reduced towards the vapor pressure of the absorption liquid.

6. The process according to claim 1, wherein the absorption liquid is circulated in the liquid loop by a pump.

7. The process according to claim 1, wherein the recycle gas flow is recycled from the condenser to one or more of the plasma generator, an ejector, or other part of the plasma reactor closed loop.

8. The process according to claim 7, wherein pressure in the plasma generator and plasma-containing gas is further reduced by the ejector, where the circulating absorption liquid is used as motive fluid in the ejector.

9. The process according to claim 1, wherein mass balance in the plasma reactor closed loop is controlled by the fresh feed absorption liquid flow.

10. The process according to claim 1, wherein the stoichiometric ratio of the composition of the feed gas to the absorbed reactive plasma products is balanced, to avoid accumulation of unreacted gas which would create a pressure build-up.

11. The process according to claim 1, wherein at least part of the absorption liquid from the condenser is oxidized in an oxidizing tower.

12. The process according to claim 1, wherein plasma generated in the plasma generator is NO-containing plasma.

13. The process according to claim 1, wherein the fresh feed gas flow is selected from air, oxygen-enriched air, nitrogen, carbon dioxide, and any mix thereof.

14. The process according to claim 1, wherein the quenching is performed with gas, liquid, solid, or any combination thereof.

15. The process according to claim 14, wherein the quenching is performed with air, oxygen-enriched air, nitrogen, steam, water, carbon dioxide, carbonate mineral, recycle gas from the condenser, or a mix of any of these.

16. The process according to claim 1, wherein the absorption liquid is water.

17. The process according to claim 1, wherein a combination of plasma and quenching is selected as follows:
   air plasma quenched with water or steam;
   nitrogen plasma quenched with water or steam;
   air plasma quenched with carbon dioxide;
   air plasma quenched with a carbonate mineral; or
   air plasma enriched with oxygen quenched with water.

18. The process according to claim 2, wherein the controller is a programmable logic controller (PLC) comprising a feedback control.

19. The process according to claim 1, wherein the generated low pressure is less than 0.8 bar.

20. The process according to claim 1, wherein the generated low pressure is less than 0.6 bar.

21. The process according to claim 1, wherein the generated low pressure is less than 0.4 bar.

22. The process according to claim 1, wherein the generated low pressure is less than 0.2 bar.

23. The process according to claim 1, wherein the generated low pressure is less than 0.1 bar.

24. The process according to claim 2, wherein the generated low pressure is less than 0.8 bar.

25. The process according to claim 2, wherein the generated low pressure is less than 0.6 bar.

26. The process according to claim 2, wherein the generated low pressure is less than 0.4 bar.

27. The process according to claim 2, wherein the generated low pressure is less than 0.2 bar.

28. The process according to claim 2, wherein the generated low pressure is less than 0.1 bar.

29. The process according to claim 10, wherein the stoichiometric ratio of the composition of the feed gas to the absorbed reactive plasma products is balanced by adjusting temperature and pressure.

30. The process according to claim 10, wherein the stoichiometric ratio of the composition of the feed gas to the absorbed reactive plasma products is balanced by adjusting temperature.

31. The process according to claim 10, wherein the stoichiometric ratio of the composition of the feed gas to the absorbed reactive plasma products is balanced by adjusting pressure.

* * * * *